US010585960B2

(12) United States Patent
Hu et al.

(10) Patent No.: US 10,585,960 B2
(45) Date of Patent: Mar. 10, 2020

(54) PREDICTING LOCATIONS FOR WEB PAGES AND RELATED TECHNIQUES

(71) Applicant: Oath Inc., New York, NY (US)

(72) Inventors: Yuening Hu, Sunnyvale, CA (US); Changsung Kang, Cupertino, CA (US); Dawei Yin, San Jose, CA (US); Yi Chang, Sunnyvale, CA (US)

(73) Assignee: Oath Inc., New York, NY (US)

( * ) Notice: Subject to any disclaimer, the term of this patent is extended or adjusted under 35 U.S.C. 154(b) by 767 days.

(21) Appl. No.: 14/868,154

(22) Filed: Sep. 28, 2015

(65) Prior Publication Data
US 2017/0091203 A1 Mar. 30, 2017

(51) Int. Cl.
G06F 16/30 (2019.01)
G06F 16/9537 (2019.01)

(52) U.S. Cl.
CPC ................. G06F 16/9537 (2019.01)

(58) Field of Classification Search
CPC .................................................. G06F 16/9537
See application file for complete search history.

(56) References Cited

U.S. PATENT DOCUMENTS

| 8,478,773 | B1 | 7/2013 | Bryukhov et al. | |
|---|---|---|---|---|
| 2002/0007364 | A1* | 1/2002 | Kobayashi | G06F 16/35 |
| 2005/0108213 | A1* | 5/2005 | Riise | G06F 16/9537 |
| 2008/0243611 | A1* | 10/2008 | Delli Santi | G06Q 30/02 |
| | | | | 705/14.64 |
| 2009/0019028 | A1* | 1/2009 | Norris | G06F 17/3087 |
| 2010/0082436 | A1* | 4/2010 | Maghoul | G06F 17/3087 |
| | | | | 705/14.58 |
| 2010/0082752 | A1* | 4/2010 | Donato | G06F 16/95 |
| | | | | 709/206 |
| 2011/0029517 | A1* | 2/2011 | Ji | G06F 16/951 |
| | | | | 707/734 |
| 2011/0252064 | A1 | 10/2011 | Murugappan | |
| 2012/0036148 | A1* | 2/2012 | Jain | G06F 16/3322 |
| | | | | 707/769 |
| 2012/0158712 | A1 | 6/2012 | Karanjkan et al. | |
| 2014/0229468 | A1 | 8/2014 | Or et al. | |
| 2015/0112978 | A1* | 4/2015 | Arora | G06F 17/3087 |
| | | | | 707/724 |
| 2016/0070703 | A1* | 3/2016 | Arora | G06F 17/3087 |
| | | | | 707/724 |

(Continued)

OTHER PUBLICATIONS

Article entitled "Handling Implicit Geographic Evidence for Geographic IR", dated Oct. 30, 2008, by Cardoso et al.*

(Continued)

Primary Examiner — Mahesh H Dwivedi
(74) Attorney, Agent, or Firm — Cooper Legal Group, LLC

(57) ABSTRACT

A location prediction framework is described for applying location labels or tags to target documents and/or identifying location-sensitive queries. Terms in content and queries are represented by corresponding term locations vectors (TLVs) in which the term is represented as a weighted distribution across locations. Each element of a TLV represents a probability that the term corresponding to the TLV relates to a particular location. Predicted locations may be introduced as features to a ranking framework to improve the identification and ranking of search results for a given query.

21 Claims, 10 Drawing Sheets

(56) References Cited

U.S. PATENT DOCUMENTS

2016/0192150 A1* 6/2016 Plasmeier ............ H04W 4/027
455/456.1
2017/0091189 A1 3/2017 Kang et al.

OTHER PUBLICATIONS

Article entitled "A Model for Geographic Knowledge Extraction on Web Documents", dated Nov. 2009, by Campelo et al.*
Y. Hu, C. Kang, J. Tang, D. Yin and Y. Chang, "Large-Scale Location Prediction for Web Pages," in IEEE Transactions on Knowledge and Data Engineering, vol. 29, No. 9, pp. 1902-1915, Sep. 1, 2017.
E. Amitay, N. Har'El, R. Sivan, and A. Soffer, "Web-a-where: Geotagging web content," in Proc. ACM SIGIR Conf. Res. Develop. Inf. Retrieval, 2004, pp. 273-280.
L. Backstrom, J. Kleinberg, R. Kumar, and J. Novak, "Spatial variation in search engine queries," in Proc. Int. Conf. World Wide Web, 2008, pp. 357-366.
C. Burges, et al., "Learning to rank using gradient descent," in Proc. 22nd Int. Conf. Mach. Learn., 2005, pp. 89-96.
Z. Cao, T. Qin, T.-Y. Liu, M.-F. Tsai, and H. Li, "Learning to rank: From pairwise approach to listwise approach," in Proc. Int. Conf. Mach. Learn., 2007, pp. 129-136.
Z. Cheng, J. Caverlee, and K. Lee, "You are where you tweet: A content-based approach to geo-locating twitter users," in Proc. ACM Int. Conf. Inf. Knowl. Manage., 2010, pp. 759-768.
J. Cho and S. Roy, "Impact of search engines on page popularity," in Proc. Int. Conf. World Wide Web, 2004, pp. 20-29.
H. Deng, I. King, and M. R. Lyu, "Entropy-biased models for query representation on the click graph," in Proc. ACM SIGIR Conf. Res. Develop. Inf. Retrieval, 2009, pp. 339-346.
A. Dong, et al., "Towards recency ranking in web search," in Proc. ACM Int. Conf. Web Search Data Mining, 2010, pp. 11-20.
J. Eisenstein, B. O'Connor, N. A. Smith, and E. P. Xing, "A latent variable model for geographic lexical variation," in Proc. Conf. Empirical Methods Natural Language Process., 2010, pp. 1277-1287.
J. R. Finkel, T. Grenager, and C. Manning, "Incorporating nonlocal information into information extraction systems by gibbs sampling," in Proc. Annu. Meet. Assoc. Comput. Linguistics, 2005, pp. 363-370.
Gazetteer. [Online]. Available: http://en.wikipedia.org/wiki/Gazetteer#cite_note-aurousseau_61-1. Downloaded Jan. 17, 2018.
B. Han, P. Cook, and T. Baldwin, "Text-based twitter user geolocation prediction," J. Artif. Intell. Res., vol. 49, pp. 451-500, 2014.
D. Ahlers and S. Boll Dr., Location-Based Web Search. Berlin, Germany: Springer, 2007.
K. Jarvelin and J. Kekalainen, "Cumulated gain-based evaluation of ir techniques," ACM Trans. Inf. Syst., vol. 20, pp. 422-446, 2002.
T. Joachims, "Optimizing search engines using clickthrough data," in Proc. ACM SIGKDD Int. Conf. Knowl. Discovery Data Mining, 2002, pp. 133-142.
E. Kaasinen, "User needs for location-aware mobile services," Pers. Ubiquitous Comput., vol. 7, No. 1, pp. 70-79, May 2003.
S. Kinsella, V. Murdock, and N. O'Hare, ""I'm eating a sandwich in glasgow": Modeling locations with tweets," in Proc. 3rd Int. Workshop Search Mining User-Generated Contents, 2011, pp. 61-68.
B. Kolmel and S. Alexakis, "Location based advertising," in Proc. M-Bus.: 1st Int. Conf. Mobile Bus., 2002, pp. 1357-1360.
J. Leveling, S. Hartrumpf, and D. Veiel, "Using semantic networks for interpreting geographical queries," in Proc. Work. Notes GeoCLEF Workshop, 2005.
C. Li and A. Sun, "Fine-grained location extraction from tweets with temporal awareness," in Proc. ACM SIGIR Conf. Res. Develop. Inf. Retrieval, 2014, pp. 43-52.
K. S. McCurley, "Geospatial mapping and navigation of the web," in Proc. Int. World Wide Web Conf., May 2001, pp. 221-229.
A. Mikheev, M. Moens, and C. Grover, "Named entity recognition without gazetteers," in Proc. 9th Conf. Eur. Chapter Assoc. Comput. Linguistics, 1999, pp. 1-8.
C. Muller and I. Gurevych, "A study on the semantic relatedness of query and document terms in information retrieval," in Proc. Conf. Empirical Methods Natural Language Process., 2009, pp. 1338-1347.
D. Nadeau and S. Sekin, "A survey of named entity recognition and classification," Linguisticae Investigationes, vol. 30, pp. 3-26, 2007.
R. Priedhorsky, A. Culotta, and S. Y. D. Valle, "Inferring the origin locations of tweets with quantitative confidence," in ACM Conf. Comput. Supported Cooperative Work Social Comput., 2014, pp. 1523-1536.
T. Qin, R. Xiao, L. Fang, X. Xie, and L. Zhang, "An efficient location extraction algorithm by leveraging web contextual information," in Proc. ACM Int. Symp. Advances Geographic Inf. Syst., 2010, pp. 53-60.
S. E. Robertson, S. Walker, S. Jones, M. Hancock-Beaulieu, and M. Gatford, "Okapi at TREC-3," in Proc. 3rd Text Retrieval Conf., 1994, pp. 109-126.
G. Salton and M. McGill, Introduction to Modern Information Retrieval. New York, NY, USA: McGraw-Hil, 1983. 466 pages. Textbook. [No electronic copy available].
E. F. T. K. Sang and F. D. Meulder, "Introduction to the CoNLL-2003 shared task: Language-independent named entity recognition," in Proc. SIGNLL Conf. Comput. Natural Language Learn., 2003, pp. 142-147.
J. Teevan, S. T. Dumais, and E. Horvitz, "Personalizing search via automated analysis of interests and activities," in Proc. ACM SIGIR Conf. Res. Develop. Inf. Retrieval, 2005, pp. 449-456.
T. Tullis and W. Albert, "Measuring the user experience: Collecting, analyzing, and presenting usability metrics," Morgan Kaufmann Publishers Inc., 2008.
C. Wang, X. Xie, L. Wang, Y. Lu, and W. Ma, "Detecting geographic locations from web resources," in Proc. Workshop Geographic Inf. Retrieval, 2005, pp. 17-24.
L. Wang, et al., "Detecting dominant locations from search queries," in Proc. ACM SIGIR Conf. Res. Develop. Inf. Retrieval, 2005, pp. 424-431.
X. Wang, Y. Zhang, W. Zhang, and X. Lin, "Efficiently identify local frequent keyword co-occurrence patterns in geo-tagged Twitter stream," in Proc. ACM SIGIR Conf. Res. Develop. Inf. Retrieval, 2014, pp. 1215-1218.
D. Yin, et al., "Ranking relevance in Yahoo search," in Proc. ACM SIGKDDInt. Conf. Knowl. Discovery DataMining, 2016, pp. 323-332.
Z. Zhuang, C. Brunk, and C. L. Giles, "Modeling and visualizing geo-sensitive queries based on user clicks," in Proc. 1st Int. Workshop Location Web, 2008, pp. 73-76.
U.S. Office Action dated Mar. 5, 2018 issued in U.S. Appl. No. 14/868,135.
U.S. Final Office Action dated Aug. 7, 2018 issued in U.S. Appl. No. 14/868,135.
U.S. Office Action dated Dec. 31, 2018 issued in U.S. Appl. No. 14/868,135.
U.S. Final Office Action dated Apr. 18, 2019 issued in U.S. Appl. No. 14/868,135.

* cited by examiner

| | Example 1 | |
|---|---|---|
| | URL | http://www.sanjose.com/elemental-wellness-b24732162 |
| | Content | elemental wellness sanjose com the next generation of cannabis collectives a wide variety of high quality flowers 2014 sanjose com a city-guide by boulevards all rights reserved ... |
| | Prediction Weights | san_jose_ca:0.604, puyallup_wa:0.484, elk_grove_ca:0.266 ... |
| | Related Term | collectives:0.556, sanjose:0.343, wellness:0.072, cannabis:0.053, flowers:0.010, elemental:0.009, high:0.002, Constant:0.003 |
| | Location Vectors | collectives |
| | | puyallup_wa:0.866, elk_grove_ca:0.367, hesperia_ca:0.205, los_angeles_ca:0.157, westport_ct:0.138, vallejo_ca:0.102, seattle_wa:0.085, rohnert_park_ca:0.068, san_francisco_ca:0.045, bossier_city_la:0.040, san_jose_ca:0.030, philadelphia_pa:0.038, sumner_wa:0.022, worcester_ma:0.015 ... |
| | | sanjose |
| | | san_jose_ca:0.940, san_francisco_ca:0.010, daly_city_ca:0.010, milpitas_ca:0.007, santa_clara_ca:0.005, palo_alto_ca:0.005, mobile_al:0.003, sunnyvale_ca:0.003, garden_grove_ca:0.003, brea_ca:0.003, river-side_ca:0.002, tully_ny:0.002, campbell_ca:0.002, gilroy_ca:0.002, fullerton_ca:0.002 ... |
| | Example 2 | |
| | URL | http://gocalifornia.about.com/cs/disneyland/a/disintro.htm |
| | Content | disneyland california visitor guide 2014 disneyland visitor s guide park details tips for a happy visit cost cutting ideas for disneyland ... |
| | Prediction Weights | anaheim_ca:0.457, los_angeles_ca:0.050, fort_worth_tx:0.013 ... |
| | Related Term | disneyland:0.156, california:0.054 Constant:0.003 |
| | Location Vectors | disneyland |
| | | anaheim_ca:0.802, hong_kong:0.204, los_angeles_ca:0.0723, orlando_fl:0.012, san_diego_ca:0.008, santa_ana_ca:0.083, buena_park_ca:0.082, tracy_ca:0.082, new_orleans_la:0.070, fullerton_ca:0.082, san_francisco_ca:0.002 ... |
| | | california |
| | | los_angeles_ca:0.156, sacramento_ca:0.805, san_diego_ca:0.347, san_francisco_ca:0.226, riverside_ca:0.148, fresno_ca:0.138, san_jose_ca:0.125, berkeley_ca:0.118, mobile_al:0.070, california_city_ca:0.078, bakers-field_ca:0.065, anaheim_ca:0.082, irvine_ca:0.057 ... |

Table 2

*FIG. 7*

| measure | baselines | | | ngram-regr20 | | | combination | |
|---|---|---|---|---|---|---|---|---|
| measure | click | url | content | top1 | top2 | top3 | click.url.content | click.url.content.ngram-regr20 |
| accuracy | 0.645 | 0.727 | 0.712 | 0.715 | 0.722 | 0.723 | 0.718 | 0.718 |
| precision | 0.571 | 1.000 | 0.721 | 0.719 | 0.727 | 0.728 | 0.628 | 0.621 |
| recall | 0.392 | 0.307 | 0.437 | 0.464 | 0.483 | 0.485 | 0.696 | 0.741 |

Table 1

PREDICTING LOCATIONS FOR WEB PAGES AND RELATED TECHNIQUES

BACKGROUND

Correctly ascertaining a user's intent underlying a search query is critical to effectively satisfying the user's information need. In some cases, intent can be directly inferred from terms in a query. For example, a user will often be explicit about the fact that a query is location-sensitive by including geographic terms in the query, e.g., "disneyland orlando." Existing approaches to identifying location-sensitive queries focus on recognizing such terms (e.g., using name entity recognition (NER) techniques in combination with the Gazetteer geographic location ontology) and location disambiguation (e.g., using natural language processing (NLP) and machine learning techniques). However, most of the work to date ignores the fact that location information may be implied by a large number of terms that are not recognizable as geographic terms. For example, the term "disneyland" is not, itself, a geographic location, but it implies multiple geographic locations, e.g., Anaheim, Calif., and Orlando, Fla. As a result, many location-sensitive queries are not recognized by existing search engines.

Moreover, many documents (e.g., web pages) that can be accessed by search engines are similarly ambiguous with regard to whether and to what extent they relate to particular locations. Even in the cases in which documents might have tags or metadata that identify a location, there may be other locations relevant to those documents that are not identified. So, even where a user's intent is understood to relate to a geographical location, many relevant results might still be missed or improperly ranked because they are not clearly identified as relating to particular locations.

SUMMARY

According to various implementations, methods, apparatus, systems, and computer program products are provided for predicting locations for documents and/or queries.

According to a particular class of implementations, location-sensitive queries are identified among a set of queries included in query log data. A location is identified for each of the location-sensitive queries. For each of the location-sensitive queries, one or more uniform resource locators (URLs) are identified from the query log data represented by one or more selections from among search results responsive to the location-sensitive query. A location-URL graph is generated representing connections among the locations and the URLs. Terms occurring in content associated with each of the URLs are identified. A term-location graph is generated from the location-URL graph and the terms. The term-location graph represents connections among the terms and the locations. Using the term-location graph and for each of the terms in the term-location graph, a value is calculated for each of the locations that represents a likelihood that the term relates to the location. This results in a set of values for each term. The set of values is represented as a term location vector for the corresponding term. The term location vectors are used to associate one or more locations with a new query or new content.

According to another class of implementations, a plurality of terms included in content is identified. A term location vector is retrieved for each of the terms. Each term location vector includes a plurality of values. Each of the values represents a likelihood that the term relates to a corresponding location. The term location vectors are processed to generate a plurality of scores for the content. Each of the scores represents a likelihood that the content relates to a corresponding one of the locations. One or more of the locations is associated with the content based on the scores. Search results are generated in response to an incoming query, the content being included among the search results based, at least in part, on the one or more locations associated with the content.

According to another class of implementations, one or more terms included in a query are identified. A term location vector is retrieved for each of the terms. Each term location vector including a plurality of values. Each of the values representing a likelihood that the term relates to a corresponding location. The one or more term location vectors are processed to generate a plurality of scores for the query. Each of the scores represents a likelihood that the query relates to a corresponding one of the locations. One or more of the locations are associated with the query based on the scores. Search results are generated in response to the query based, at least in part, on the one or more locations associated with the query.

A further understanding of the nature and advantages of various implementations may be realized by reference to the remaining portions of the specification and the drawings.

BRIEF DESCRIPTION OF THE DRAWINGS

FIG. 7 illustrates examples of location prediction according to a particular implementation.

FIG. 9 provides another comparison of precision and recall according to different models.

Figure 10:
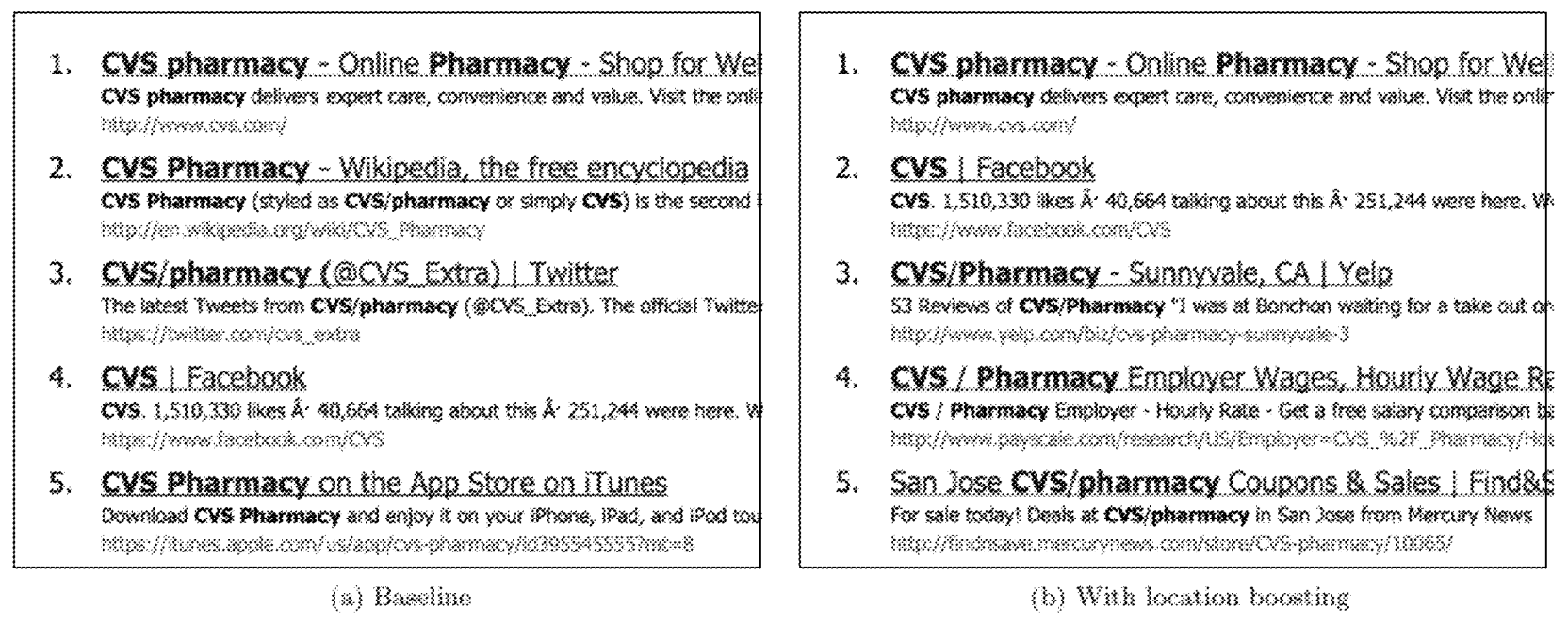

FIG. 10 provides an example of a comparison of the ranking of search results with and without the use of location prediction as described herein.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

This disclosure describes a location prediction framework configured for applying location labels or tags to target documents (e.g., web pages and other online content) and/or identifying location-sensitive queries. Terms (e.g., words and/or phrases) in content and queries are represented by corresponding term locations vectors (TLVs) in which the term is represented as a weighted distribution across locations. Each element of a TLV represents a probability that the term corresponding to the TLV relates to a particular location. The higher the probability for a given location, the closer the relationship between the term and the location. By contrast, a uniform distribution across locations means the term is unlikely to relate to any particular location.

A location prediction framework implemented as described herein may be used in the identification and ranking of relevant documents in accordance with a ranking framework; implementations of which are also described in this disclosure. Predicted locations (for queries and/or target documents) may be introduced as features to such a ranking framework to improve the identification and ranking of search results for a given query.

Figure 1:
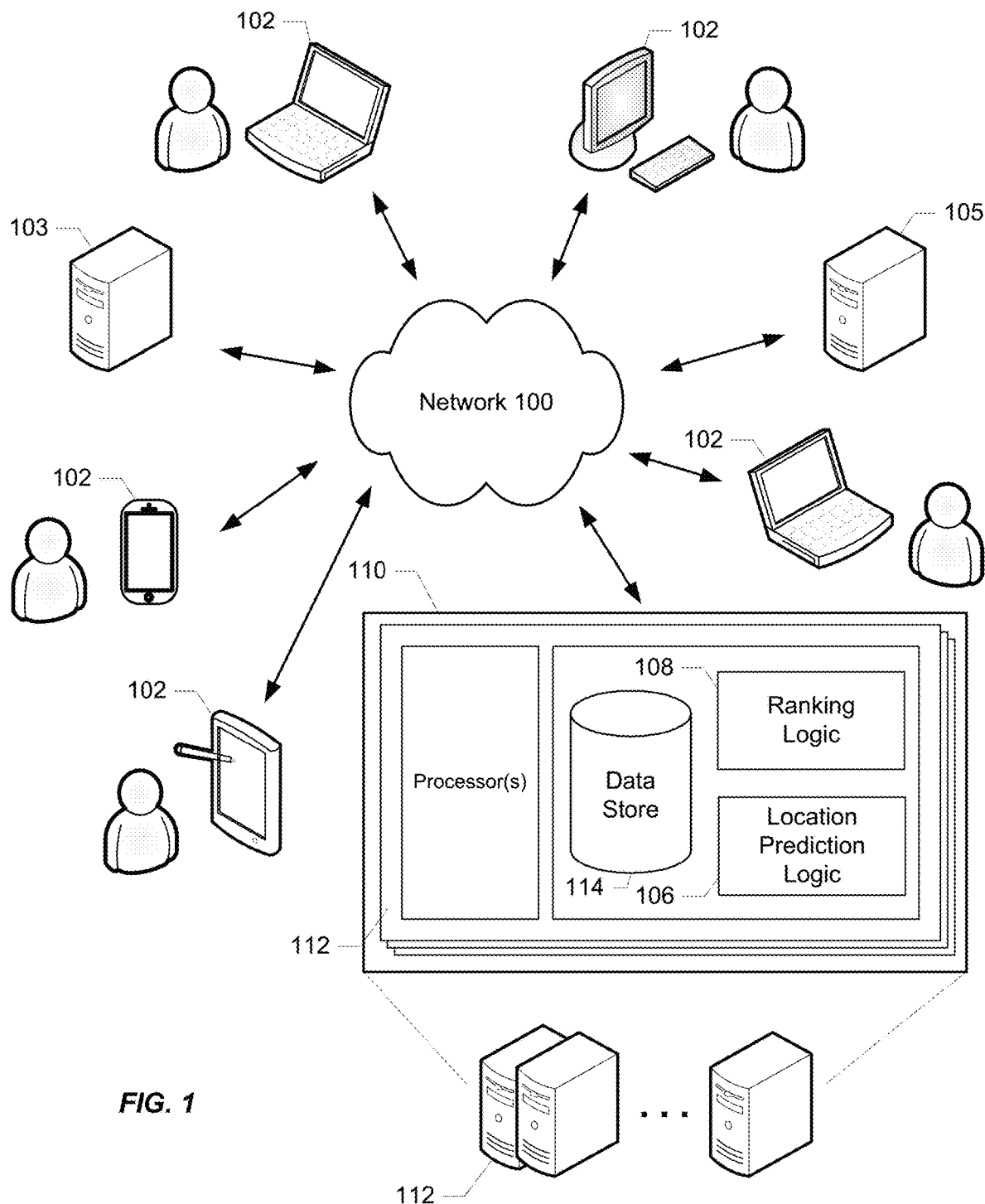
FIG. 1 is a simplified network diagram of an example of a computing environment in which various implementations may be practiced.

FIG. 1 shows a network environment in which the techniques enabled by this disclosure may be implemented. The depicted network 100 may include any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Client devices 102 may be any device capable of connecting to network 100 and interacting with the great diversity of sites, networks, and systems (not shown) interconnected by or integrated with network 100. Such devices include, but are not limited to, mobile devices (e.g., cell phones, smart phones, smart watches, tablets, etc.), personal computers (e.g., laptops and desktops), set top boxes (e.g., for cable and satellite systems), smart televisions, and gaming systems.

For the sake of clarity and simplicity, FIG. 1 and the following description assumes an implementation in which location prediction and the ranking of search results as enabled by the frameworks described in this disclosure (represented by location prediction logic 106 and ranking logic 108) are implemented as part of a platform 110 that provides search services to client devices 102. As will be understood, platform 110 may conform to any of a wide variety of architectures such as, for example, a distributed platform deployed at one or more co-locations, each implemented with one or more servers 112. Data store 114 is also shown as part of platform 110 and may include, among other things, search index data, TLV data, query log data, click data, content location labels, etc. However, it should be noted that implementations are contemplated in which one or more of these functions or data sets operate or are stored remotely from the others (e.g., on other platforms such as 103, 104, or 105), and/or are under the control of one or more independent entities.

It should also be noted that, despite references to particular computing paradigms and software tools herein, the logic and/or computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, any references to particular protocols herein are merely by way of example. Suitable alternatives known to those of skill in the art for all of these variations may be employed.

Figure 2:
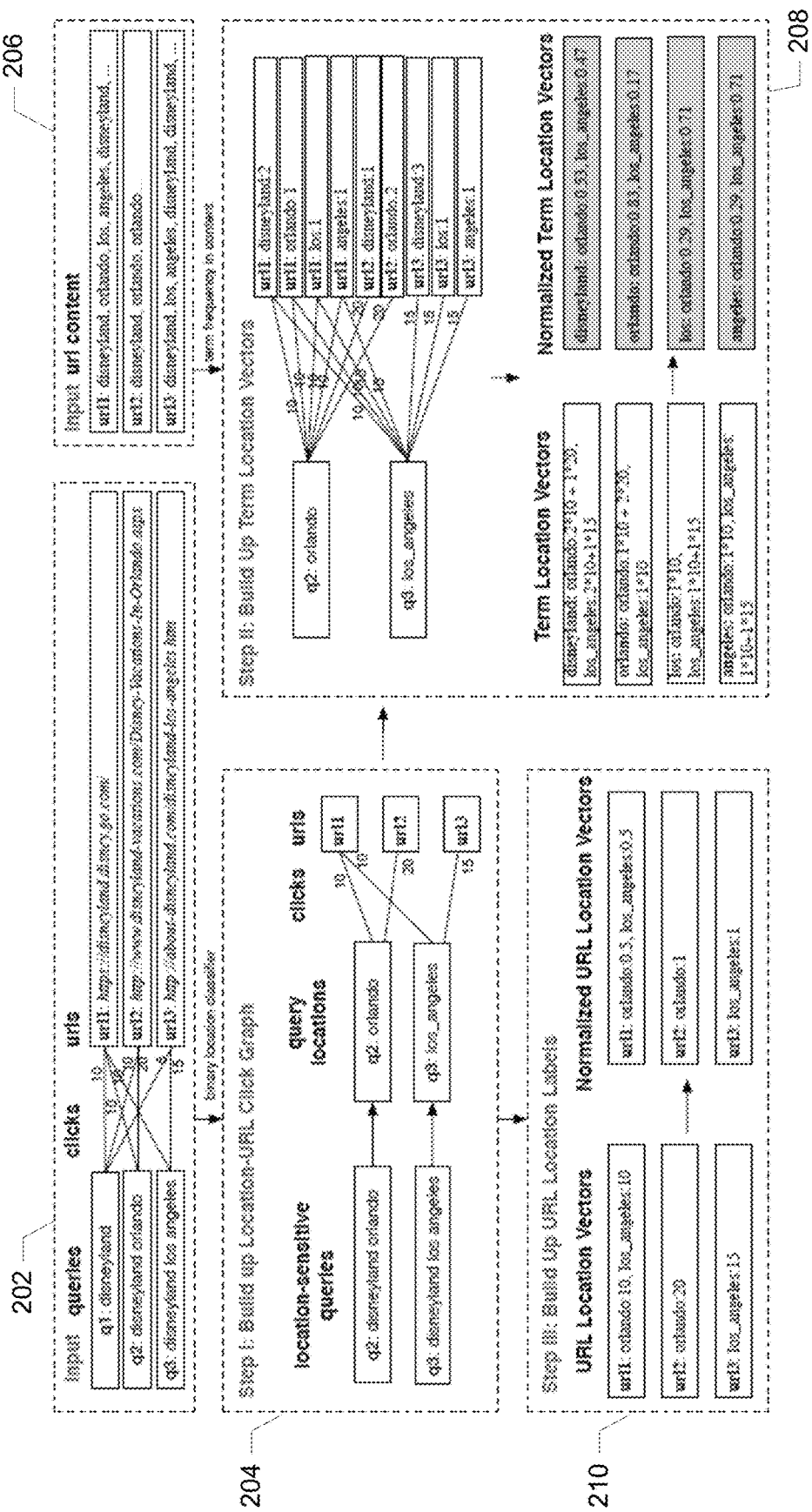
FIG. 2 illustrates generation of term location vectors (TLVs) and URL location labels according to a particular implementation.

An example of a location prediction framework will now be described with reference to FIGS. 2-10. According to a particular implementation, term location vectors (TLVs) are derived using query-URL click data in query logs maintained by a search service, and the content associated with uniform resource locators (URLs) that is responsive to the queries. An example of a representation of such query log data is shown in FIG. 2 in which queries q1, q2, and q3 are shown in relation to URLs urn, url2, and url3 with the connections including the number of clicks that resulted from a particular query to the corresponding URL (202). It should be noted that, while specific implementations are described herein with reference to URLs and Web pages, these references are merely by way of example, and the scope of this disclosure is not so limited. That is, the techniques described herein may be employed in any computing environment in which a set of documents may be identified and accessed using some form of search technology.

A location-URL click graph is constructed representing the connections between URLs and locations associated with the queries. An assumption is that the URL pages that users clicked in search results responsive to their queries are related to the locations contained in their queries. For example, for a query "disneyland orlando,", if users clicked the URL "http://www.disneyland-vacations.com/Disney-Vacations-In-Orlando.aspx", it means this URL is likely related to the location "orlando". To extract locations from queries, we identify the location-sensitive queries in the query log data. This cannot be directly done for all queries by a query location parser because the locations for queries can be implicit. For example, when users search for "restaurant", they are typically looking for restaurants nearby, even though there is no explicit location in the query. There are a variety of ways known to those of skill in the art by which location information associated with queries can be identified. According to a particular implementation, lexical features (unigram and bigrams) of the queries in the query-URL click data are used to train a logistic regression model to identify the location-sensitive queries.

Figure 3:
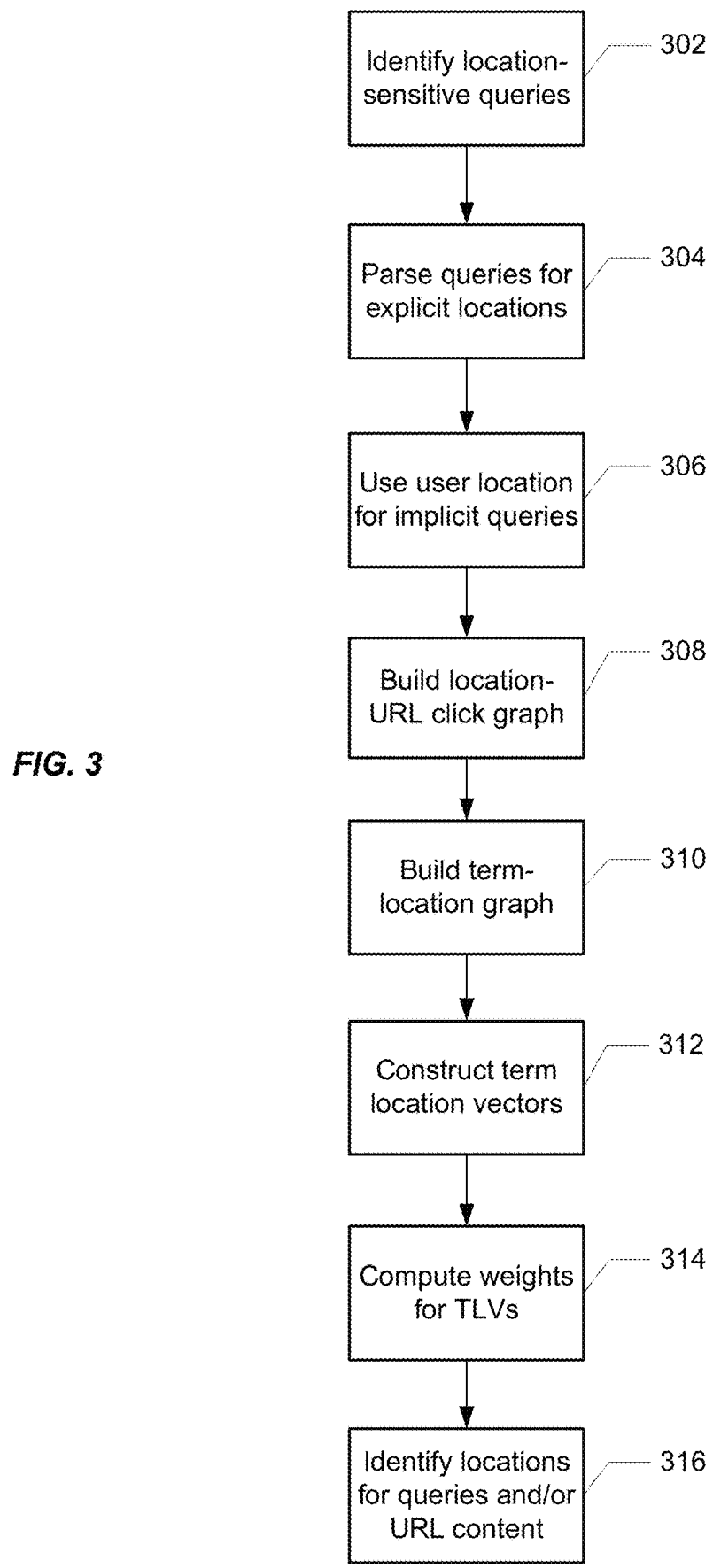
FIG. 3 is a flowchart illustrating operation of a particular implementation.

Referring to the flowchart of FIG. 3, once location-sensitive queries in the query-URL click data are identified (302), a location matching algorithm parses the queries directly for explicit locations (304). For queries with implicit locations, the users' locations are used as the query location (306). To build the location-URL click graph, the URLs and the locations extracted from the queries are used as nodes, and the clicks between query results and URLs are retained as the weighted edges between the query locations and the URLs (308). Referring again to the example shown in FIG. 2, query "disneyland orlando" and "disneyland los angeles" are identified as location-sensitive queries as discussed above. The locations "Orlando" and "Los Angeles" are parsed from the two queries. The clicks between the original queries and URLs are kept as weighted edges between the locations and URLs (204).

Using the URL content (206) and the location-URL click graph, we can construct a graph between locations and terms (310), where each edge of the graph is weighted by clicks, and each term is weighted by its frequency in the URL content. For example, if the number of clicks between query location "Orlando" and URL1 is 10, the weight between "Orlando" and each term in URL1 is also 10 as shown in FIG. 2 (208).

Using the term-location graph, we can construct the TLVs (312). One is assumption is that, if a location is connected to a URL page, the location should also be related with the terms contained in the URL page. In addition, the importance of the location to a term in the URL page should be reflected in how important the term is in the URL page. So, according to a particular implementation, we use term frequency to weight the clicks: assume URL u and query location s have clicks $c_{u,s}$, and word v appears in URL u with frequency $w_{u,v}$. The probability $l_{v,s}$ of term v at location s can be computed as shown in Equation 1. Once we compute the probability $l_{v,s}$ for each location s, we obtain the term location vector $l_v$ for term v:

$$l_{v,s} = \frac{\sum_u c_{u,s} \cdot w_{u,v}}{\sum_s \sum_u c_{u,s} \cdot w_{u,v}} \quad (1)$$

FIG. 2 shows an example of computing the term location vectors (208). As shown in the graph in 208, "disneyland" is connected to the location "Orlando" through both URL1 and URL2. Thus the weight for "Orlando" in the TLV for the term "disneyland" is computed by summing over the weighted clicks as shown in Equation 1. Since each term location vector $l_v$ is a distribution over all locations for this term v, this effectively captures the relevance between locations and different terms. Location information for non-location terms is captured by this vector, e.g., "disneyland" is related with the locations "Orlando" and "Los Angeles." For location terms, not only the accurate location but also other related locations are captured. For example, term "Orlando" is related with both the location "Orlando" and the location "Los Angeles." As will be appreciated, this information is helpful for identifying the final location(s) of particular URL pages.

According to some implementations, no human intervention is required for constructing TLVs. Thus, TLVs can be updated automatically as new click data becomes available to obtain more accurate location vectors. According to a particular implementation, we use a sparse representation for this location distribution. That is, we only list the locations with non-zero weights for each term, significantly improving computation efficiency.

Because URL content often includes a considerable amount of noise, the use of term frequency alone to accurately capture term importance may not be sufficient (e.g., since irrelevant stop words also have high frequencies). Therefore, according to a particular class of implementations, we use the terms in the queries to describe the URL pages that users actually clicked, i.e., "click text". The assumption is that this is an effective way to describe the URL pages because users are highly likely to click the URLs whose content matches well with the queries terms from which they constructed their queries. In addition, the term weights from click text can be used to weight clicks.

Assume a URL u has a set of queries $\{q_j\}$ with non-zero clicks $\{c_{u,qj}\}$, we can represent the click text for u as a weighted vector, in which each word v has weight $w_{u,v}$, computed as shown in Equation 2:

$$w_{u,v} = \frac{\sum_j c_{u,q_j} \cdot I_{q_j,v}}{\sum_v \sum_j c_{u,q_j} \cdot I_{q_j,v}} \quad (2)$$

where the indicator $II_{q_j,v}$ is 1 if query $q_j$ contains word v and 0 otherwise.

Figure 4:
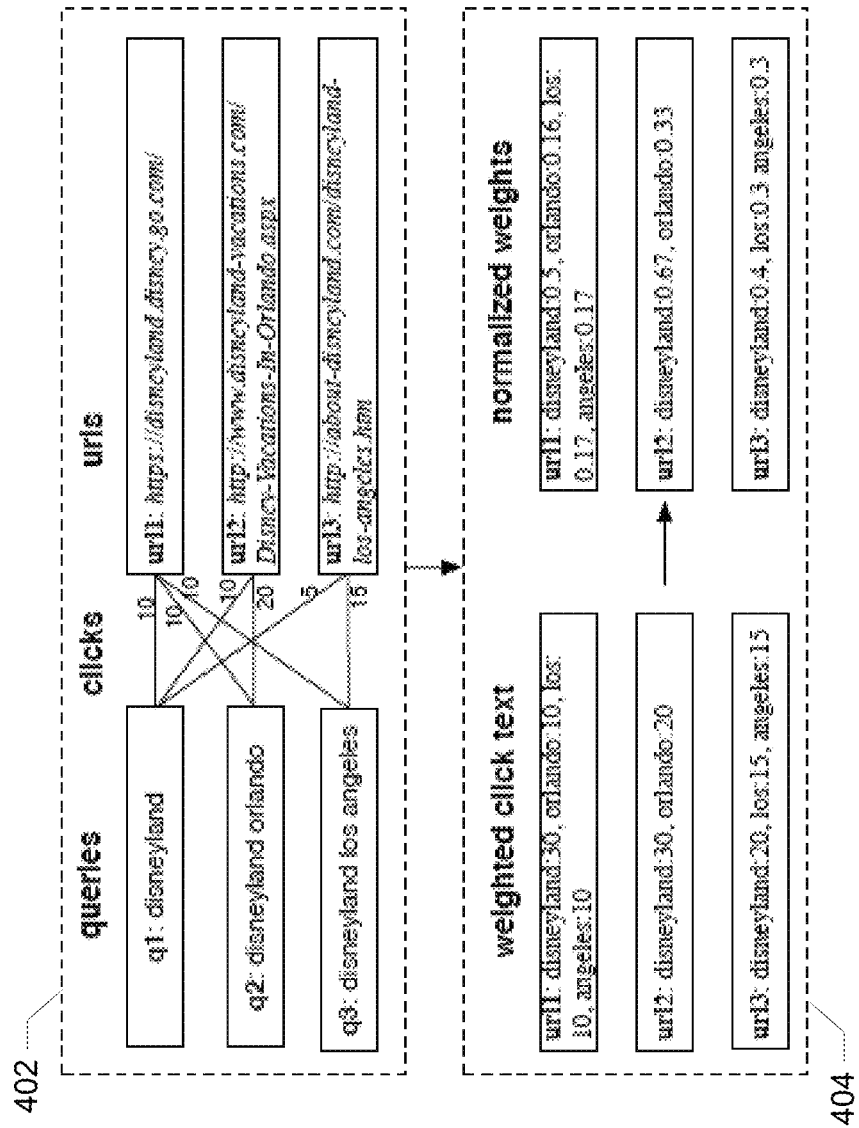
FIG. 4 illustrates generation of URL click text according to a particular implementation.

FIG. 4 shows an example of extracting click text for URL pages, where URL1 ("https:/disneyland.disney.go.com/") has clicks from all the three queries: "disneyland," "disneyland orlando," and "disneyland los angeles" (402). Thus URL1 is related with four words "disneyland," "orlando," "los," and "angeles." Given the query-URL clicks, we weight the query words by the clicks, and normalize the click text for each URL (404) as shown in Equation 2. Once we have the weighted click text as URL content, we can compute the weighted TLVs using the click text and their weights (314). These weighted TLVs may then be used to determine whether new queries are location-sensitive and/or whether particular content (e.g., a web page accessible via a URL) should be labeled as relating to one or more locations (316).

Terms in queries and URL content are often not limited to unigram words. Therefore, according some implementations, the proposed framework incorporates contextual information into terms. For example, we can encode context to ngrams and build up ngram term location vectors (ngram-TLVs). This can be accomplished, for example, by using ngrams in queries and extracting the ngram click text for URL pages. We can also use a combination of different ngrams to capture the URL content on different levels.

While TLVs capture location information for terms, it may still be unclear how important a term (and its corresponding TLV) is in the task of predicting the location(s) for a given URL. According to some implementations, a weight is derived for each TLV based on a regression model to capture the importance of each TLV for location prediction. However, location labels for training data are needed to learn these weights, and it may be infeasible to obtain such location labels manually. Therefore, according to a particular implementation, we extract URL location labels for training data based on click data automatically. The intuition is that clicks of a URL reflect user belief that this URL is related with the query location. Though the click data is likely to contain noise, more clicks increase the confidence of the URL location labels. Given the location-URL graph of FIG. 2 (208), we can use the connected locations as the URL location labels, and the weight of each label can be obtained from clicks. Thus, for example, URL1 is connected to "Orlando" and "Los Angeles" with equal weight 0.5 since both q2-URL1 and q3-URL1 have 10 clicks (210). Note the location labels for each URL page may be a distribution over locations rather than a single location label, which allows us to capture related locations rather than just one location. In addition to the URL location labels from click data, we can also use location matching in URLs, title and abstracts to extract location labels. The combination of these different ways for extracting location labels may significantly improve the size of training data.

Figure 5:
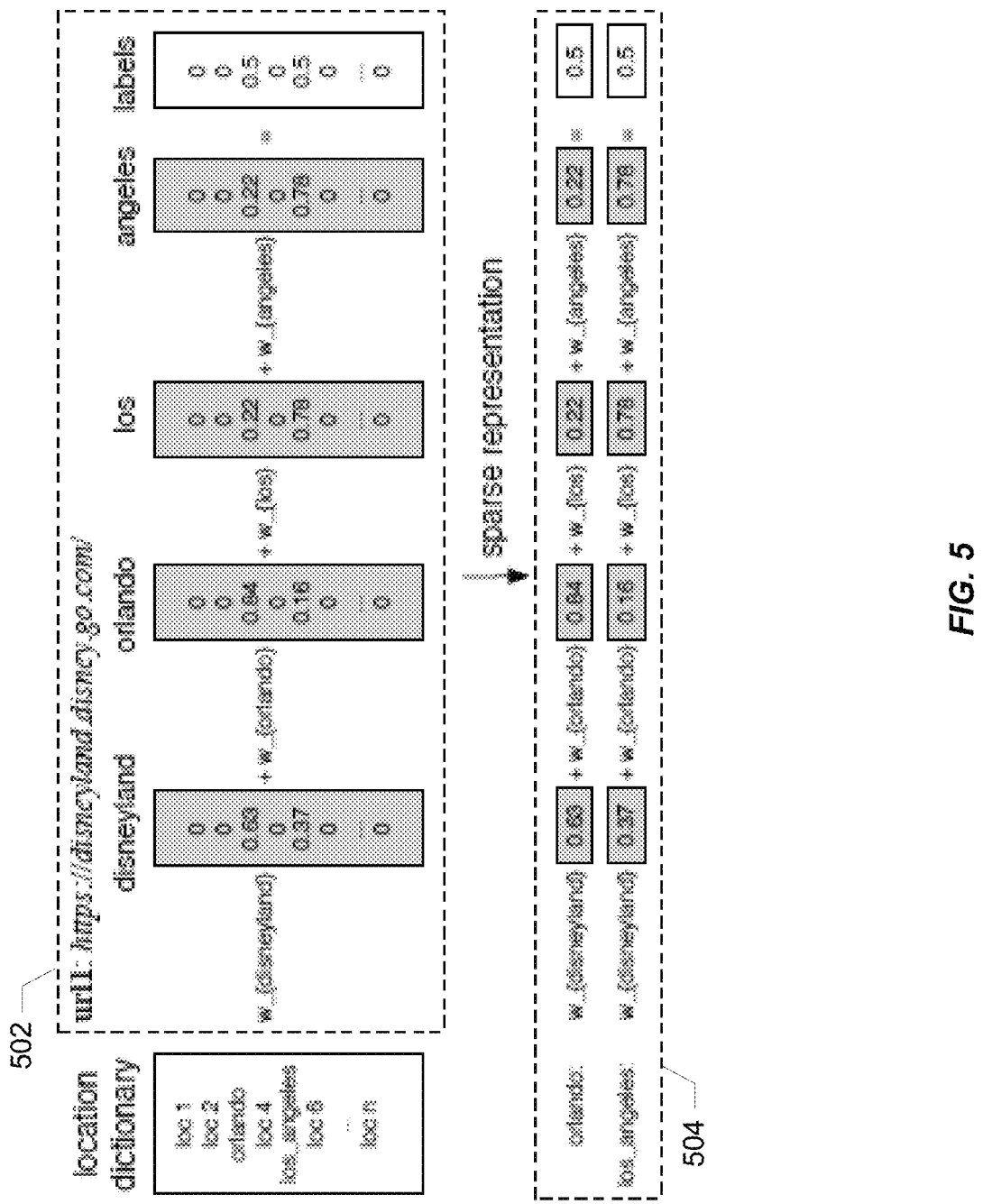
FIG. 5 illustrates an example of a sparse representation of a regression model for use with various implementations.

Given the TLVs and URL location labels we can train a regression model. The goal of this regression model is to derive a weight for each term (and its TLV) to capture each term's impact on location prediction. As shown in FIG. 5, this is a vector regression problem with potentially a very large number of parameters to learn (502). For example, for the data discussed below, there are 2.4M unigram-TLVs with location dimension 36,961; which means we need to learn 88.7B regression parameters. The parameter space is further extended to 857.5B for ngram-TLVs. In addition, we have 23.2M training examples, thus this computation can potentially become a bottleneck of this model.

However, we notice that the TLVs and URL location labels are very sparse, including many zero values. As a result, we can simplify the problem to a scalar regression based on a sparse representation to improve efficiency (504). We then learn the regression weights using, for example, Vowpal Wabbit, a machine-learning library and program developed by Yahoo! Research and, later, Microsoft Research. For the tests discussed below, the test data did not have click text available, so we use URL content including, for example, title and abstract. As will be discussed, given the TLVs and their weights learned from training data, we were able to predict the locations for test URLs with a high degree of confidence.

To demonstrate the effectiveness of the proposed model, we construct both unigram TLVs and ngram TLVs, and train regression models for each to learn the weights. We compare the proposed model against multiple baselines as well as their combination. We also compare the results using the weights from regression models against uniform weights and heuristic weights.

The experiment focuses on predicting the city-level locations (36,961 locations) in the United States for different URLs. We normalize the forms of locations as city names followed by the abbreviations of state names. For example, "Orlando, Fla." is normalized as "orlando_fl," and "San Jose, Calif." as "san_jose_ca." To predict the locations, we use about 4.6B query-url click pairs from query logs as our training data and follow the steps described above to build up the TLVs. Among the query-URL pairs from the query logs, there are about 138M location-sensitive query-URL click pairs, based on which we build up 2.4M unigram-TLVs and 23.2M ngram-TLVs, where ngram includes all the unigram, bigram and trigram terms in the experiment. About 20M URLs are labeled with locations either by parsing the location-sensitive queries or by parsing their URLs and content using location matching. These labeled URLs are used as training data of the regression models as discussed above.

For test data, we randomly sample about 650 location-sensitive queries from query logs. The location-implicit queries are expanded to location-explicit queries by using user locations. We then scrape the top 15 URLs for each query, and obtain 9,166 unique URLs. Editors are asked to label the locations of these URL pages, which is used as the true labels for evaluation. To evaluate the prediction results, we report standard precision, recall, and accuracy. The confusion matrix is computed on different levels based on the distance between the top predicted location and the true location, denoted as dis-N. A predicted location is counted as true positive only when the distance between the predicted location and the true location is no larger than N. For example, dis-0 means the predicted location is counted as true positive when the predicted location exactly matches with the true location; and dis-5 is computed where a predicted location is counted as true positive when the distance between the predicted location and the true location is less than or equal to 5 miles.

We compare the unigram location vectors (unigram) and ngram location vectors (ngram) by plotting the precision-recall curve. We also compare the results using weights from regression models (regr) against uniform weights (uniform) and the simple heuristics to use larger weights for location terms and lower-weights for non-location terms (loc). We use weights 1 and 0.1 for location terms and non-location terms, respectively. For the regression models, we also compared using the top 20 locations (regr20) in the location vector for each term against using only top 10 locations (regr10). Precision and recall are computed when the predicted location is the same as the true location.

Figure 6:
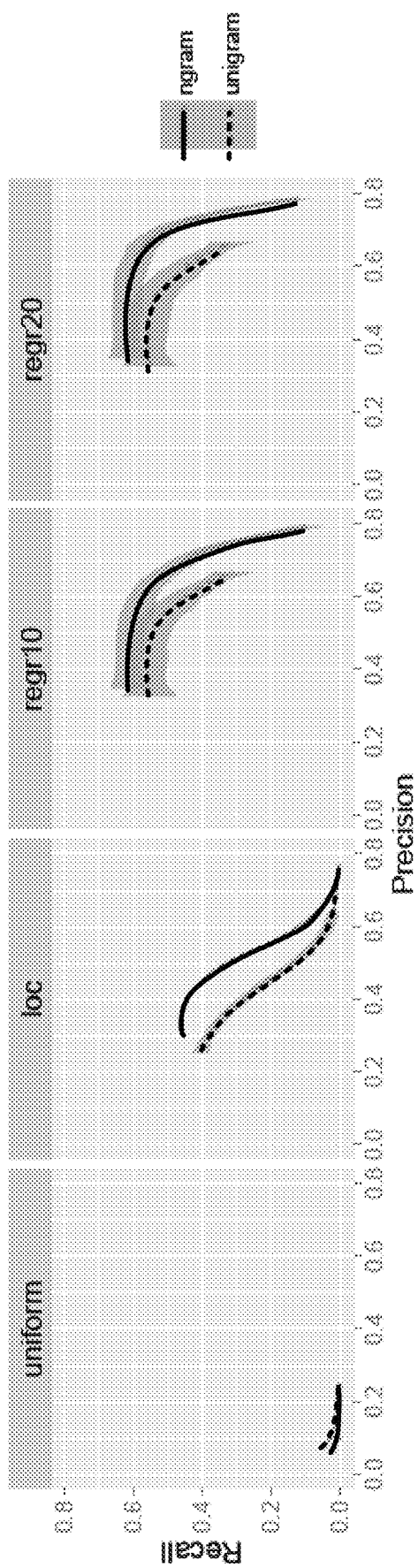
FIG. 6 provides a comparison of precision and recall for various types of TLVs.

As shown in FIG. 6, the regression-based models (regr10 and regr20) perform significantly better than uniform and loc. This is believed to be because the regression models can capture the importance of different location vectors more accurately. Take Example 1 in Table 2 of FIG. 7 as an example. For words that do not contain much location information such as "wellness" and "high," the weights learned from regression models are very small; even having negative effects in some cases. For mis-typed location words like "sanjose" and non-location words that contain strong location signals such as "collective", high weights are obtained from the regression model.

Because ngram location vectors are able to capture more context information than unigram location vectors, in general, models with ngram TLVs obtained better results than those with unigram TLVs, e.g., loc, regr10 and regr20 in FIG. 6. However, in the model with uniform weights (uniform), the model with unigram TLVs yields higher recall at the beginning. This is because ngram model contains more noise since the vocabulary size is much larger, and thus the ngram model is not able to show its effectiveness with uniform weights.

The regr20 model performs slightly better than regr10 with higher precision. For example, when we fix precision to be 0.6, the recall of regr20 is 0.6 while regr10 is about 0.58. Recalling the sparse representation introduced above, for each URL, a larger number of locations per term increases the number of regression equations. This increases the number of negative examples to balance the regression training, thus the recall is higher.

Figure 8:
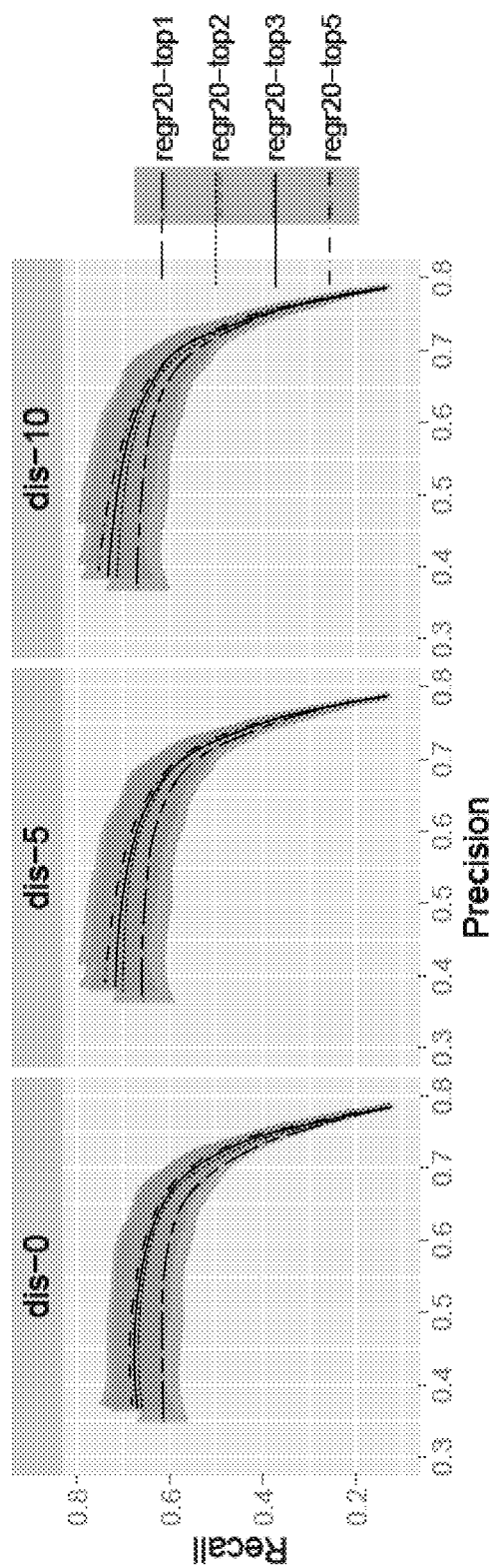
FIG. 8 provides another comparison of precision and recall for various types of TLVs.

The results depicted in FIG. 6 evaluate the top-1 predicted location using dis-0 measures. We further evaluate the top-M predicted locations of regr20 by various dis-N measures (i.e., N=0; 5; 10) as shown in FIG. 8. In general, the results are better with larger M and N, especially when the precision is low. With higher precision, this effect gradually disappears, and results converge. There is no big difference between the results of top-1 and top-5 evaluations when precision is higher than 0.6, which shows that the proposed model can predict the top-1 location accurately.

We compare our proposed model ngram-regr20 with three different baseline models. As discussed above, we can get location labels based on user clicks, but this model has limited coverage and inaccurate user clicks introduce noise. We refer to this baseline model as the click model. Some location information may be contained in the URL itself with some fixed formats. For example, "http://www.yelp.com/biz/24-hour-fitness-san.francisco-7" contains the location "san_francisco_ca"; "http://www.zillow.com/austin-tx/houses/" also shows the location "austin_tx". Given a fixed list of locations that we want to predict, we can do location matching in URLs, and we refer to this baseline model as the url model. Similar to the url model, the content of URL pages also contains useful location information. We also apply location matching in URL content to predict location, and we refer to this baseline as the content model.

As shown in Table 1 of FIG. 9 comparing performance of these various models, the baseline click model has a limited coverage as expected, but also a lower precision than expected. This may be because some noise has been introduced due to clicks from some generic Web pages. For example, when users search for "walmart new york", they may also click a generic Web page "http://www.walmart.com/" even though it is not related with location "new york" directly.

The baseline url model has very high precision as expected. This is because the URL page is highly likely to be location related if there is a location included in the URL. However, this baseline has very limited recall. The baseline content model has a higher recall than both the click and url models, but still quite limited. The precision of the content model is lower than the url model but higher than the click model. As shown, the ngram-regr20 model performs better than all three baseline models in recall, while maintaining comparable accuracy and precision as the content model. The recall is further increased when we consider the top 2 predicted locations. However, there is no significant difference between the results of ngram-regr20-top2 and ngram-regr20-top3 which means that the regression model is able to capture the location accurately in top-2 predictions.

We further build up the combination of these models based on multi-vote of predicted locations, i.e., given a URL page and the predicted locations from different models, we choose the location with most votes as the final prediction. If the predicted locations are all different, we select the results in the decreasing order of single-model precision: (url, content, ngram-regr20, click). The results are shown in the "combination" column in Table 1. The two combined models obtained much higher recall than any of the single models, which shows that there is a considerable lack of overlap among the predictions of the four models. The combination click.url.content.ngram-regr20 obtains higher recall than the combination of the three models click.url.content; which shows a 6.5% relative recall improvement. We also compute the combination of the four models using the top-2 and top-3 predicated locations. Interestingly, the results are the same as using the top-1 predicted location only. The locations captured in top-2 and top-3 positions by ngram-regr20 are covered by the combination of the three baseline models already, thus no further improvement is seen in the combined results.

To study the effectiveness of the proposed ngram-regr model in location prediction, we analyze specific examples. We specifically focus on examples where the baseline models fail and the ngram-regr model succeeds. Example 1 in Table 2 of FIG. 7 shows a case where ngram-regr successfully handles the tokenization error in the page and predicts location accurately. The location "San Jose" is represented as "sanjose" in both the URL and the content of the Web page, and thus it cannot be correctly detected by simple matching, in which case the baseline models fail to predict this as a location. However, the connection between "san jose" and "sanjose" is successfully learned by TLVs, and the correct location is predicted. The ngram-regr model builds up the location vectors for "sanjose" correctly with the dominant probability for location "san_jose_ca" and very small probabilities for related or surrounding locations; the ngram-regr model also learns a large weight for important terms "sanjose" and "collectives," while only small positive or negative weights for unrelated terms such as "wellness" and "flowers". Because "san_jose_ca" has a much larger probability for the term "sanjose" than the term "collectives", the term "sanjose" dominates the location prediction.

We also show another example where there is no specific location in Table 2. As shown in Example 2, the content of this URL contains "california" but not a specific city-level location. However, the ngram-regr model learns that the TLV for "disneyland" has a very high probability for location "anaheim_ca", which is also part of "california". The model successfully captures the relation between a non-location term "disneyland" and a general location term "california", and predicts the location as "anaheim_ca". Note that though the non-location term "disneyland" does not have as large a weight as the location term "sanjose", it still contains important location information and contributes to the location prediction. Such information can be an important location hint, especially when there is no other specific location term in the context. And though there are only two terms having non-zero probabilities of location "anaheim_ca", the location signal from the combination of these two terms is strong enough to predict the page location. It is also interesting to note that the second location prediction of this URL is "los_angeles_ca", which is also referred to as the location of Disneyland in California in many cases. This is also captured by the terms "disneyland" and "california".

There are a variety of cases where the proposed ngram-regr model may be helpful to reduce location ambiguity. In one example, a local news channel or business might be mentioned in a URL page but without specific location information. In another example, references to multiple cities might appear in a Web page. In another example, only a state name might be referenced in a URL page. For example, the URL page "http://ung.edu/theater/" includes the city name "Gainesville" without a reference to the state name, and "Gainesville" exists in multiple states including "New York", "Texas", "Florida", etc. Nevertheless, the ngram-regr model successfully predicts the page is relating to "Georgia". In another example, even though the URL page "http://www.nbcchicago.com/blogs/inc-well/Instacart-Delivery-Service-Touches-Down-in-Chicago-224167511.html" includes references to both "San Francisco" and "Chicago", the ngram-regr model picks the right location as "Chicago" with the help from the related non-location terms.

On the other hand, the ngram-regr model may sometimes fail to predict locations when the content of the Web pages does not include enough information, or there are not enough training data for learning TLV weights. For example, given inappropriate TLV weights, non-location-related terms with large weights may introduce noise to the prediction. In one example, we did not obtain the content of URL "http://www.manta.com/c/mmg6qp0/kfc" automatically. As a result, the ngram-regr fails to accurately predict a location while human editors labeled the location correctly. In another example relating to the URL http://www.oneidaindiannation.com/about/careers/employment, the ngram-regr model successfully predicts the correct location "oneida_ny" but, due to noise from other terms, "oneida_ny" is only ranked in the second position. In another example, and due to limited training data for the location "lafayette_la", the ngram-regr model fails to learn an appropriate weight for term "lafayette", and thus fails to predict the location for the URL page "http://louisiana.edu/admissions".

Noise can also be introduced by editor labels. For example, the URL "http://www.google.com/finance?cid=25913" is not related with a location, but a human editor incorrectly labeled it as relating to the location "grapevine_tx". In addition, some Web pages update their content automatically according to a user's location. Thus, a human editor labeled generic Web pages such as "http://www.fandango.com/movietimes" and "https://www.facebook.com/OliveGarden" with specific locations.

According to various implementations, location prediction frameworks enabled by the present disclosure may be used to improve the relevance of search results for location-sensitive queries. Web search results are often generic across users. However, for some queries, contextualized search results are more useful. For example, for the query "restaurants" users typically want to see results for restaurants near their current locations. To boost the ranking of such results, the distance between the user and a page may be computed in accordance with a location prediction framework as described herein.

Let d(userloc,URL) be the geographical distance between the user's location userloc and the URL page location. For URLs with multiple location labels, d(userloc,URL) is the minimum distance between the user's location and each of the location labels. The ranking function $f: \mathbb{R}^d \to \mathbb{R}$ for location-sensitive queries is defined on the feature vector $x \in \mathbb{R}^d$ for a (query, userloc, URL) tuple. According to a particular implementation, the ranking function is given by:

$$f(x) = f_b(x') + w \frac{1}{1 + e^{\alpha f_b'(x') + \beta}} d(userloc, URL) \qquad (3)$$

where $f_b(x')$ is the base ranking function defined on the feature vector $x' \in \mathbb{R}^{d'}$ for a (query, URL) tuple and $f_b'(x')$ is a light-weight approximation (e.g., a linear function) of $f_b(x')$.

The base ranking function $f_b(x')$ is trained on a large training data set and the value is typically very large. According to a particular implementation, the logistic function is used to control the distance boosting based on relevance, e.g., if the URL is close to user and the content matches the query well, the ranking for this URL page will be boosted by the distance function; however, if URL is very close to the user but is not relevant to the query, there is no score boosting by distance. A lighter relevance function $f_b'(x')$ is used instead of $f_b(x')$ in the logistic function to make the evaluation of $f(x)$ e_cient at run time. We assume $f_b(x')$ and $f_b'(x')$ are already available (e.g., trained by conventional learning-to-rank methods).

The parameters w, α and β are trained by minimizing $$\sum_{(d_i, d_j) \in P} \max(0, 1 - f(x_i) + f(x_j))^2 \qquad (4)$$

where $P = \{(d_i, d_j) | d_i > d_j\}$ is a set of preference pairs. $d_i > d_j$ denotes that the former is more preferred than the latter. P is obtained by human experts. We solve the above optimization problem by a standard gradient descent approach.

We compare the search relevance of our new ranking function $f(x)$ and the base ranking function $f_b(x')$ as applied to 500 location-sensitive queries. These queries are sampled from query logs and the URLs are judged by human experts. As the evaluation metric, we use DCG5 which is defined as:

$$DCG5 = \sum_{i=1}^{5} \frac{G_i}{\log_2(i+1)} \qquad (5)$$

where $G_i$ is a relevance grade (ranging from 0 to 10) given to the i-th URL in the search results.

Based on the 500 queries, the new ranking function improves DCG5 compared to the base ranking function by +6.92%, a highly significant improvement in the context of Web search relevance. An example of a comparison is provided in the screen shots of FIG. 10 which compare two search results pages for a query "cvs". The base ranking function produced the results on the left which rank URLs with no specific location context on top. Note that the depicted business is a large chain business that has many locations. On the other hand, the new ranking function with distance boosting ranks local results relatively higher for users in the San Francisco Bay Area.

We also conducted online experiments to observe how users interact with the new ranking function. We performed "bucket tests" over a certain period to compare the base ranking function and the new ranking function in a commercial search engine. The bucket is created based on user cookies. A cookie is assigned to a fixed bucket in our test period. Each bucket corresponds to a small percentage of the user population who use the search engine. In different buckets, we show search results of different ranking functions. We use click-through rate (CTR) as our user experience metric to compare the two functions under the assumption that higher CTR implies a better user experience. Again, due to confidentiality reasons, we do not report the exact CTR but instead report a relative difference. The bucket test result shows that our new ranking function improves CTR by +4.78% compared to the base ranking function. This result is consistent with the offline experimental results (DCG) and shows that the new ranking function outperforms the base ranking function due to the effective identification and boosting of location features.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method, comprising:
   identifying location-sensitive queries among a set of queries included in query log data;
   identifying a first location for a first location-sensitive query of the location-sensitive queries;
   identifying a second location for a second location-sensitive query of the location-sensitive queries;
   building a location-uniform resource locator (URL) click graph associating the first location-sensitive query to the first location and the second location-sensitive query to the second location, wherein the location-URL click graph associates the first location with a first URL and a second URL, and the location-URL click graph associates the second location with the first URL and a third URL;
   building a term-location graph based on the location-URL click graph, the term-location graph associating the first location with a first term in association with the first URL, associating the first location with the first term in association with the second URL, associating the first location with a second term in association with the first URL, associating the first location with the second term in association with the second URL, associating the second location with the first term in association with the first URL, associating the second location with the first term in association with the third URL, and associating the second location with the second term in association with the first URL;

building a set of term location vectors based on the term-location graph, wherein a first term location vector for the first term is determined based on one or more weights of one or more edges associating one or more locations with one or more terms in the term-location graph;

identifying a plurality of terms included in content;

for each term of the plurality of terms, retrieving a corresponding term location vector from the set of term location vectors stored in at least one data store, the term location vector including a plurality of values, each of the plurality of values corresponding to a different one of a plurality of locations and representing a likelihood that the term relates to the corresponding one of the plurality of locations;

processing term location vectors to generate a plurality of scores for the content, each of the plurality of scores representing a likelihood that the content relates to a corresponding one of the plurality of locations;

associating one or more of the plurality of locations with the content based on the plurality of scores; and generating search results in response to an incoming query, the content being included among the search results based, at least in part, on the one or more of the plurality of locations associated with the content.

2. The method of claim 1, wherein the one or more locations associated with the content include a second plurality of locations, each of the second plurality of locations being weighted in accordance with a corresponding one of the plurality of scores.

3. The method of claim 1, comprising identifying the incoming query as location-sensitive, wherein the search results are generated using one or more locations associated with the incoming query.

4. The method of claim 1, comprising:
identifying the incoming query as location-sensitive using one or more term location vectors corresponding to terms in the incoming query.

5. The method of claim 3, wherein the one or more locations associated with the incoming query include a user location, and wherein generating the search results includes modifying a base ranking function to rank the search results based, at least in part, on distances between the user location and one or more locations associated with each of the search results.

6. The method of claim 1, comprising determining that the incoming query is location-sensitive, wherein generating the search results includes modifying a base ranking function to rank the search results based, at least in part, on distances calculated using one or more locations associated with each of the search results.

7. The method of claim 1, wherein the plurality of terms include at least one term that is not a geographic term.

8. The method of claim 4, wherein the terms in the incoming query are not geographic terms.

9. The method of claim 1, the set of term location vectors being generated independent from the content using query-log data pertaining to location-sensitive queries.

10. A computer program product comprising one or more non-transitory computer-readable media having computer program instructions stored therein, the computer program instructions being configured such that, when executed by one or more computing devices, the computer program instructions cause the one or more computing devices to:

identify location-sensitive queries among a set of queries included in query log data;

identify a first location for a first location-sensitive query of the location-sensitive queries;

identify a second location for a second location-sensitive query of the location-sensitive queries;

build a location-uniform resource locator (URL) click graph associating the first location-sensitive query to the first location and the second location-sensitive query to the second location, wherein the location-URL click graph associates the first location with a first URL and a second URL, and the location-URL click graph associates the second location with the first URL and a third URL;

build a term-location graph based on the location-URL click graph, the term-location graph associating the first location with a first term in association with the first URL, associating the first location with the first term in association with the second URL, associating the first location with a second term in association with the first URL, associating the first location with the second term in association with the second URL, associating the second location with the first term in association with the first URL, associating the second location with the first term in association with the third URL, and associating the second location with the second term in association with the first URL;

build a set of term location vectors based on the term-location graph, wherein a first term location vector for the first term is determined based on one or more weights of one or more edges associating one or more locations with one or more terms in the term-location graph;

identify a plurality of terms included in content;

for each term of the plurality of terms, retrieve a corresponding term location vector from the set of term location vectors stored in at least one data store, the term location vector including a plurality of values, each of the plurality of values corresponding to a different one of a plurality of locations and representing a likelihood that the term relates to the corresponding one of the plurality of locations;

process the term location vectors to generate a plurality of scores for the content, each of the plurality of scores representing a likelihood that the content relates to a corresponding one of the plurality of locations;

associate one or more of the plurality of locations with the content based on the plurality of scores; and generate search results in response to an incoming query, the content being included among the search results based, at least in part, on the one or more locations associated with the content.

11. The computer program product of claim 10, wherein the one or more locations associated with the content include a second plurality of locations, each of the second plurality of locations being weighted in accordance with a corresponding one of the plurality of scores.

12. The computer program product of claim 10, the computer program instructions being configured such that, when executed by the one or more computing devices, the computer program instructions cause the one or more computing devices to:

identify the incoming query as location-sensitive, wherein the search results are generated using one or more locations associated with the incoming query.

13. The computer program product of claim 10, the computer program instructions being configured such that, when executed by the one or more computing devices, the computer program instructions cause the one or more computing devices to:
    identify the incoming query as location-sensitive using one or more term location vectors corresponding to terms in the incoming query are used to.

14. The computer program product of claim 12, wherein the one or more locations associated with the incoming query include a user location, and wherein generating the search results includes modifying a base ranking function to rank the search results based, at least in part, on distances between the user location and one or more locations associated with each of the search results.

15. The computer program product of claim 10, the computer program instructions being configured such that, when executed by the one or more computing devices, the computer program instructions cause the one or more computing devices to:
    determine that the incoming query is location-sensitive, wherein generating the search results includes modifying a base ranking function to rank the search results based, at least in part, on distances calculated using one or more locations associated with each of the search results.

16. A system, comprising one or more computing devices configured to:
    identify location-sensitive queries among a set of queries included in query log data;
    identify a first location for a first location-sensitive query of the location-sensitive queries;
    identify a second location for a second location-sensitive query of the location-sensitive queries;
    build a location-uniform resource locator (URL) click graph associating the first location-sensitive query to the first location and the second location-sensitive query to the second location, wherein the location-URL click graph associates the first location with a first URL and a second URL, and the location-URL click graph associates the second location with the first URL and a third URL;
    build a term-location graph based on the location-URL click graph;
    build a set of term location vectors based on the term-location graph, wherein a first term location vector for a first term is determined based on one or more weights of one or more edges associating one or more locations with one or more terms in the term-location graph;
    identify a plurality of terms included in content;
    a likelihood that the term relates to a corresponding one of a plurality of locations; for each term of the plurality of terms, retrieve a corresponding term location vector from a set of term location vectors stored in at least one data store, the term location vector including a plurality of values, each of the plurality of values corresponding to a different one of a plurality of locations and representing a likelihood that the term relates to the corresponding one of the plurality of locations;
    process the term location vectors to generate a plurality of scores for the content, each of the plurality of scores representing a likelihood that the content relates to a corresponding one of the plurality of locations;
    associate one or more of the plurality of locations with the content based on the plurality of scores; and
    generate search results in response to an incoming query, the content being included among the search results based, at least in part, on the one or more of the plurality of locations associated with the content.

17. The system of claim 16, wherein the one or more locations associated with the content include a second plurality of locations, each of the second plurality of locations being weighted in accordance with a corresponding one of the plurality of scores.

18. The system of claim 16, the one or more computing devices configured to:
    identify the incoming query as location-sensitive, wherein the search results are generated using one or more locations associated with the incoming query.

19. The system of claim 16, the one or more computing devices configured to:
    identify the incoming query as location-sensitive using one or more term location vectors corresponding to one or more terms in the incoming query.

20. The system of claim 18, wherein the one or more locations associated with the incoming query include a user location, and wherein generating the search results includes modifying a base ranking function to rank the search results based, at least in part, on distances between the user location and one or more locations associated with each of the search results.

21. The system of claim 16, the one or more computing devices being configured to:
    determine that the incoming query is location-sensitive, wherein generating the search results includes modifying a base ranking function to rank the search results based, at least in part, on distances calculated using one or more locations associated with each of the search results.

* * * * *